United States Patent [19]
Avitable et al.

[11] Patent Number: 5,753,992
[45] Date of Patent: May 19, 1998

[54] SINGLE PIECE BRUSH FIXTURE FOR DYNAMOELECTRIC MACHINE

[76] Inventors: Raymond C. Avitable, 8455 Hidden Lake Dr., Indianapolis, Ind. 46250; Robert Farra, 35 Willow St., Acton, Mass. 01720; Thomas P. Hosmer, 122 Crescent Rd., Concord, Mass. 01742

[21] Appl. No.: 746,238

[22] Filed: Nov. 7, 1996

[51] Int. Cl.$^6$ .................................................. H02K 13/00
[52] U.S. Cl. .................. 310/239; 310/238; 310/242; 310/245
[58] Field of Search .................................. 310/239, 238, 310/242, 245

[56] References Cited

U.S. PATENT DOCUMENTS

| | | | |
|---|---|---|---|
| 3,025,421 | 3/1962 | Sievert | 310/245 |
| 3,983,432 | 9/1976 | Rankin | 310/242 |
| 4,384,225 | 5/1983 | Iwaki et al. | 310/88 |
| 4,389,588 | 6/1983 | Rankin | 310/242 |
| 4,800,313 | 1/1989 | Warner et al. | 310/242 |
| 4,990,811 | 2/1991 | Nakata et al. | 310/239 |
| 4,994,701 | 2/1991 | Bulick | 310/239 |
| 5,059,846 | 10/1991 | Concannon | 310/239 |
| 5,113,104 | 5/1992 | Blaettner et al. | 310/90 |
| 5,227,688 | 7/1993 | Gotoh | 310/239 |
| 5,237,231 | 8/1993 | Blaettner et al. | 310/239 |
| 5,296,772 | 3/1994 | Bradfield et al. | 310/242 |
| 5,397,952 | 3/1995 | Decker et al. | 310/242 |
| 5,463,264 | 10/1995 | Koenitzer | 310/242 |
| 5,506,461 | 4/1996 | Okabe | 310/239 |

FOREIGN PATENT DOCUMENTS 1488903  6/1989  U.S.S.R. .................. 310/239

OTHER PUBLICATIONS

Research Disclosure 33,480 Feb. 1992.

*Primary Examiner*—Steven L. Stephan
*Assistant Examiner*—Karl Imayoshi E. Tamai
*Attorney, Agent, or Firm*—Ice Miller Donadio & Ryan; Jay G. Taylor

[57] ABSTRACT

A substantially enclosed brush holder assembly includes a brush fixture of singular piece construction for use in a harsh operating environment, such as that in which a motor vehicle alternator operates. An exemplary brush holder assembly according to the present invention includes a brush fixture for use in connection with a dynamoelectric machine. The brush fixture has at least one brush compartment that is configured to receive a brush. The brush fixture also includes at least one set of spring coil compartments, each of which are designed to receive one of two spring coils of a constant force extension spring. These spring coil compartments are adjacent to and in open communication with the brush compartment, thereby allowing the constant force extension spring to be extended through the brush compartment and peripherally around the brush located therein. The interiors of both the brush compartment and each of the spring coil compartments are substantially enclosed when the brush fixture is affixed to a cooperative shielding fixture. In particular, the brush fixture includes only one open face, and the open face is advantageously configured to receive the cooperative shielding fixture, which when assembled to the brush fixture substantially encloses the brush fixture.

9 Claims, 4 Drawing Sheets

SINGLE PIECE BRUSH FIXTURE FOR DYNAMOELECTRIC MACHINE

FIELD OF THE INVENTION

This invention relates generally to dynamoelectric machines, and more specifically, to a brush holder assembly for use in connection with dynamoelectric machines.

BACKGROUND OF THE INVENTION

Dynamoelectric machines, for example, electric generators and motors, include brushes for providing an electrical contact between a spinning rotor of the machine and an electrical power circuit. The brush physically contacts the spinning rotor of the machine, and includes a contact wire or contact element that connects to the power circuit. These brushes tend to wear from the rotational friction caused by contact with the rotor. If the brush is not properly fixtured, it can erode unevenly and lose contact with the rotor, causing the machine to fail.

One type of brush fixture that has been developed utilizes a constant force extension spring in order to maintain brush contact with the rotor. The constant force extension spring offers the advantage of providing approximately constant force throughout the usable length of the brush. Thus, a fixture utilizing a constant force extension spring maintains brush contact with the rotor and offers improved durability and reliability of the dynamoelectric machine.

At present, however, constant force extension spring brush fixtures have limited use in harsh operating environments, such as the environment of a motor vehicle alternator, which is a type of generator. Alternators are exposed to the severe environment of a vehicle engine compartment, and thus are exposed to a plurality of contaminants including oil, grease, debris and salt spray. The constant force extension spring brush fixture has not been employed in motor vehicle alternators presumably because adequate fixtures have not been developed to protect the spring and brush assemblies from the especially harsh environment of a vehicular engine compartment. For example, typical constant force extension spring brush fixtures have a substantially open architecture in order to allow the contact wire to travel freely as the brush erodes. This type of open design, which leaves the brush substantially exposed to the operating environment, is not a viable option for use in a motor vehicle alternator. Salt spray, grease, oil and other contaminants from the operating environment of a alternator could corrode the brush or otherwise corrupt the electrical connection between the brush and the rotor. Electrical contact with the spinning rotor would then be lost, causing alternator failure.

One approach to solving the problem of a harsh operating environment is to utilize an enclosed brush fixture. U.S. Pat. No. 5,463,264, issued Oct. 31, 1995, to Koenitzer, discloses a brush fixture which is enclosed in a cylindrical housing. However, the brush fixture is constructed of multiple elements that require complex assembly. The fixture itself comprises a container and a rotatably insertable cap portion. Additionally, in order to maintain an electrical contact between the brush and a rotor, U.S. Pat. No. 5,463,264 requires that the brass conductor be installed within the cylindrical housing. Once the brass conductor is installed, a terminal, located at one end of a shunt which is affixed to the brush, must be fit into a slot formed by the brass conductor and the cylindrical housing. This arrangement of parts and assembly procedures are all necessary in the Koenitzer device just to provide an enclosed brush fixture.

Accordingly, a need exists for a brush holder assembly comprising a brush fixture of singular piece construction that substantially encloses the spring and brush assembly to protect it from the operating environment of a motor vehicle alternator and still allow the contact wire of the brush to travel freely as the brush erodes.

SUMMARY OF THE INVENTION

The present invention overcomes the disadvantages of the prior art by providing a substantially enclosed brush holder assembly including a brush fixture of singular piece construction. The singular piece construction reduces the assembly complexity and costs associated therewith. Because the brush holder assembly is substantially enclosed, it is suitable for use in a harsh operating environment, such as that in which a motor vehicle alternator operates.

An exemplary brush holder assembly according to the present invention includes a brush fixture for use in connection with a dynamoelectric machine. The brush fixture has at least one brush compartment that is configured to receive a brush. The brush fixture also includes at least one set of spring coil compartments, each of which are designed to receive one of two spring coils of a constant force extension spring. These spring coil compartments are adjacent to and in open communication with the brush compartment, thereby allowing the constant force extension spring to be extended through the brush compartment and peripherally around the brush located therein. The interiors of both the brush compartment and each of the spring coil compartments are substantially enclosed when the brush fixture is affixed to a cooperative shielding fixture. In particular, the brush fixture includes only one open face, and the open face is advantageously configured to receive the cooperative shielding fixture, which when assembled to the brush fixture substantially encloses the brush fixture.

The above features and advantages of the present invention, as well as others, will become more readily apparent to those of ordinary skill in the art by reference to the following detailed description and accompanying drawings.

DETAILED DESCRIPTION

Figure 1:
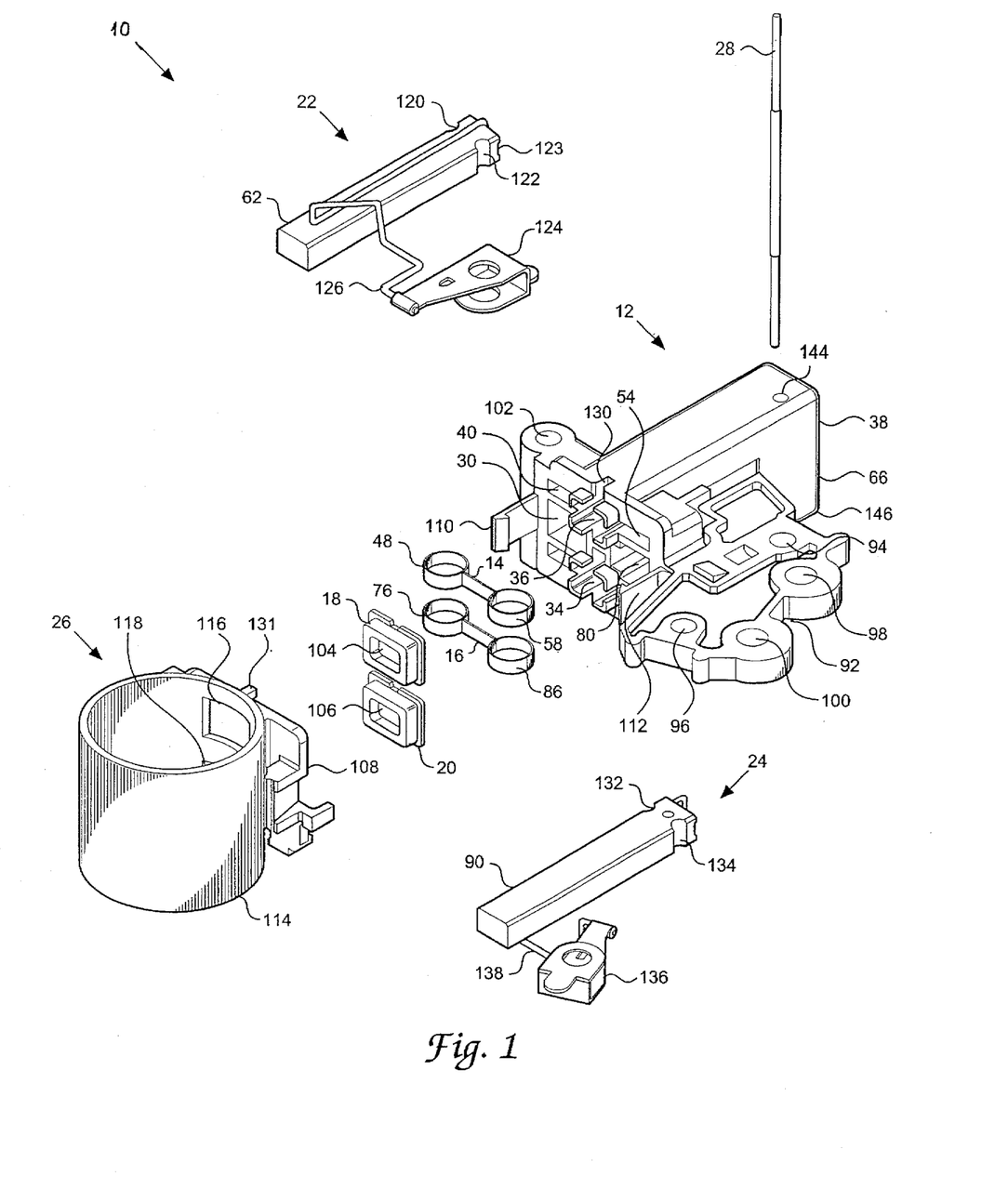
FIG. 1 is an exploded perspective view of an exemplary brush holder assembly according to the present invention.
Figure 2:
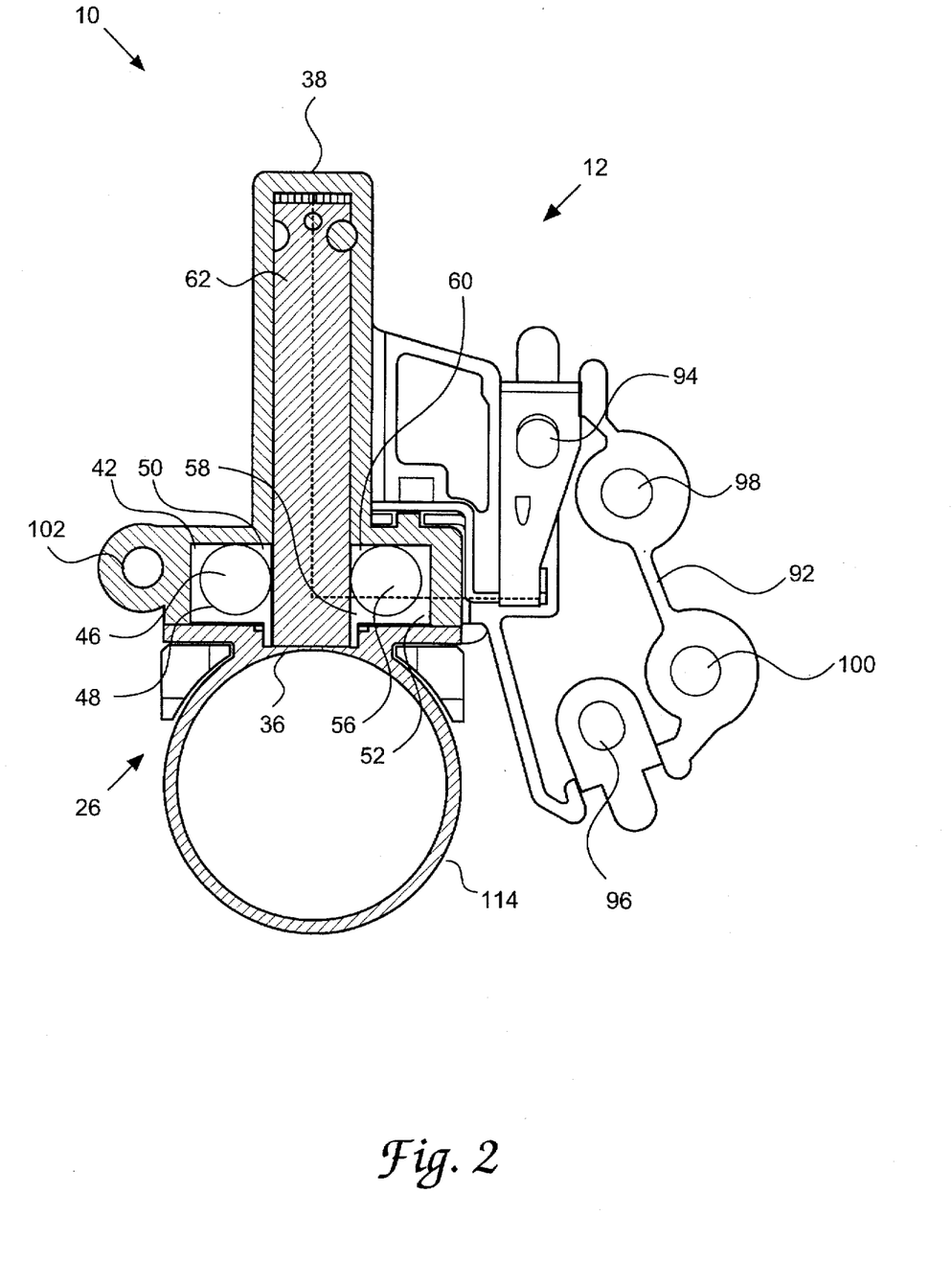
FIG. 2 is a plan view of the brush holder assembly of FIG. 1.

FIG. 1 and FIG. 2 show an exemplary brush holder assembly 10 according to the present invention. Although the exemplary brush holder assembly 10 shown in FIG. 1 and FIG. 2 is specifically designed for a motor vehicle alternator, not shown, the brush holder assembly of the present invention is suitable for use with many types of dynamoelectric machines, including motors and other types of generators. The brush holder assembly 10 comprises a brush fixture 12, first and second constant force extension springs 14, 16, first and second dust seals 18, 20, first and second brush and clip assemblies 22, 24, a shielding fixture 26, and an assembly pin 28. It is noted that while the exemplary brush holder assembly 10 is intended to provide fixturing for two brushes, those of ordinary skill in the art may readily modify the brush holder assembly 10 to accommodate more or fewer brushes.

The brush fixture 12, which includes only one open surface 30, is of singular piece construction and is preferably fabricated of high temperature thermoplastic, such as General Electric Ultem 1000 thermoplastic, using well known injection molding techniques. The exemplary brush fixture 12 includes first and second brush compartments 32, 34. The first brush compartment 32 has the shape of an elongated box, and includes an open end 36, a closed end 38 and an interior 40 which is advantageously configured to receive a brush.

The first brush compartment 32 is associated with and is integral with a first spring coil compartment 42, located near the open end 36 of the first brush compartment 32, and a second spring coil compartment 52, located opposite the first spring coil compartment 42 with respect to the first brush compartment 32. The first spring coil compartment 42 is boxlike in shape having an open front 44 and further having an interior 46 for receiving a spring coil 48 of a constant force extension spring 14. The first spring coil compartment 42 further has an open side 50 that is in direct communication with the first brush compartment 32.

The second spring coil compartment 52 is substantially similar to the first spring coil compartment 42. Specifically, the second spring coil compartment 52 is boxlike in shape having an open front 54 and further having an interior 56 for receiving a spring coil 58 of a constant force extension spring 14. The second spring coil compartment 52 further has an open side 60 that is in direct communication with the first brush compartment 32.

The direct communication between the first brush compartment 32 and the first and second spring coil compartment 42, 52 allows uncoiled spring material to travel between the spring coils 48, 58 of the constant force extension spring 14 toward the closed end 38 of the first brush compartment 32. When a brush 62 is inserted into the first brush compartment 32, the spring coils 48, 58 of the constant force extension spring 14 unravel thereby causing the constant force extension spring 14 to stretch to nearly the entire length of the first brush compartment 32 as shown in FIG. 2.

The second brush compartment 34 is substantially similar in structure to the first brush compartment 32. The second brush compartment 34, like the first brush compartment 32, is also associated with and is integral with a set of spring coil compartments 70, 80. The spring coil compartments are analogously situated as and structurally similar to the first and second spring coil compartments 42 and 52.

The brush fixture 12 thus has only one open surface 30, defined by the open ends of the brush compartments 32, 34 and open ends of the spring coil compartments 42, 52, 80 and 90. When a cooperating shield in fixture is attached, and the rotor of the dynamoelectric machine is in place, the interiors of the brush compartments 32 and 34 are substantially enclosed and protected from debris contamination.

The brush fixture 12 includes a mounting plate 92 which is located on one side of the brush fixture 12. The mounting plate 92 has two mounting holes 94, 96 for the purpose of attaching the brush and clip assemblies 22, 24 to the brush fixture 12. The mounting plate 92 also includes two locating holes 98, 100 used for affixing the brush holder assembly 10 either directly to the dynamoelectric machine, or at least in a predetermined position with respect to the dynamoelectric machine. The brush fixture 12 also includes a bolt hole 102, which is also used for attaching the brush holder assembly 10 to the particular application being utilized, located on the side opposite the mounting plate 92.

The first dust seal 18 is manufactured of rubber and has a rectangular shape which is advantageously designed to fit snugly over the open end 36 of the first brush compartment 32. The first dust seal 18 includes a rectangular opening 104 that is approximately the same size as the cross section of the brush 62. Thus, when placed over the open end 36 of the first brush compartment 32, the first dust seal 18 prevents debris from entering into the first brush compartment 32 from the operating environment of the brush holder assembly 10.

The second dust seal 20 is substantially similar to the first dust seal 18. In particular, the second dust seal 20 is manufactured of rubber and has a rectangular shape which is advantageously designed to fit snugly over the open end of the second brush compartment 34. The second dust seal 20 further includes a rectangular opening 106 that is approximately the same size as the cross section of the brush 90. When placed over the open end of the second brush compartment 34, the second dust seal 20 prevents debris from entering into the second brush compartment 34.

The brush holder assembly 10 includes a shielding fixture 26 which is of singular piece construction and is designed to operate cooperatively with the brush fixture 12. The shielding fixture 26 may suitably comprise a single piece of injection-molded plastic. The shielding fixture 26 includes a face plate 108 that is a flush fit to the open surface 30 of the brush fixture 12. The shielding fixture 26 is affixed to the brush fixture 12 by first and second shield clips 110, 112 that extend from the brush fixture 12 near the open surface 30 and engage the shielding fixture 26. Once in place, the shielding fixture 26 completely encloses the first and second spring coil compartments 42, 52 of the first brush compartment 32 and the first and second spring coil compartments 70, 80 of the second brush compartment 34. The shielding fixture 26 also substantially encloses the first and second brush compartments 32, 34.

The shielding fixture 26 includes a cylindrical housing 114 that is advantageously designed with a diameter only slightly larger than a rotor of the dynamoelectric machine, not shown. The cylindrical housing 114 includes a first cylindrical housing opening 116 that is rectangular in shape and is designed to allow the first dust seal 18 to be a line contact fit into the first cylindrical housing opening 116, thereby preventing debris from the environment near the rotor from entering into the first brush compartment 32. The second cylindrical housing opening 118 is substantially similar to the first cylindrical housing opening 116. The second cylindrical housing opening 118 is rectangular in shape and is designed to allow the second dust seal 20 to be press fit into the second cylindrical housing opening 118, thereby preventing debris from the environment near the rotor from entering into the second brush compartment 34.

The first brush and clip assembly 22 includes the brush 62 which may suitably be an electrographitic carbon brush, such as one which is available from St. Mary's Carbon Company of St. Mary's, Pa. The brush 62 is solid and has the shape of an elongated rectangular box. Near one end of the brush 62, the brush 62 includes two semi-circular grooves 120, 122 on opposite sides of the brush 62, the purpose of which will become more readily apparent below. The brush 62 further includes a groove 121 for receiving and engaging a portion of the constant force extension spring 14. (See also FIG. 4.)

The first brush and clip assembly 22 also includes a brush clip 124 that attaches to the mounting plate 92 of the brush fixture 12. The brush clip 124 is attached to the brush 62 by a contact wire 126, preferably made of copper, that electrically connects the brush 62 to an electrical power circuit, not shown. If the brush holder assembly 10 is used in connection with a motor vehicle generator, then the electrical power circuit will typically include a battery, not shown. If the brush holder assembly 10 is used in connection with a motor, then the power circuit may be any suitable power source used to provide current to the electric motor. The contact wire 126 is attached at or near an end of the brush 62, proximate to the semi-circular grooves 120, 122. (See also FIG. 4.)

Figure 3:
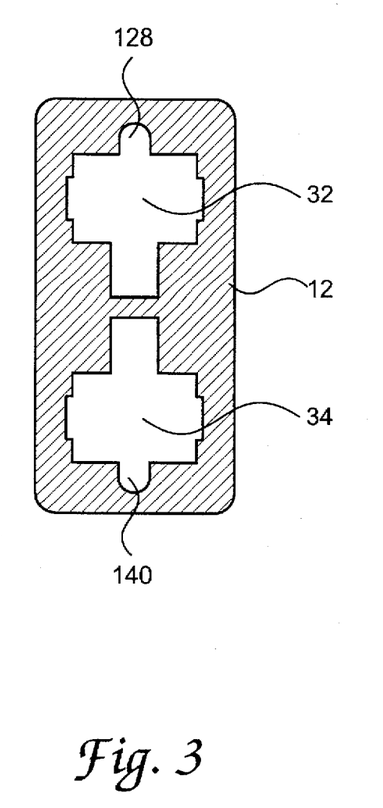
FIG. 3 is a cross-sectional view of two brush compartments of a brush fixture of the brush holder assembly if FIG. 1.

As illustrated in FIG. 3, at least one of the interior walls of the first brush compartment 32 includes a narrow channel 128 that receives the contact wire 126. When the brush 62 is inserted into the first brush compartment 32, the contact wire 126 is routed along the interior 40 of the first brush compartment by the channel 128. Referring again to FIGS. 1 and 2, the contact wire 126 then exits the interior 40 of the first brush compartment 32 through a wire groove 130, which is located on at least one side of the brush fixture 12 near the open end 36 of the first brush compartment 32. It is noted that the shielding fixture 26 preferably includes a lug 131, which is received by the wire groove 130 to lock the contact wire 126 into place when assembled.

Because the contact wire 126 is routed in this fashion, the interior of the brush holder assembly 10 may remain substantially enclosed and protected from the harsh operating environment, for example, in the application of a motor vehicle alternator. The narrow channel 128 also allows the contact wire to remain unrestricted as the brush 62 erodes during the operation of the dynamoelectric machine.

The second brush and clip assembly 24 is substantially similar to the first brush and clip assembly 22. The second brush and clip assembly 24 includes a brush 90 which may also suitably be an electrographitic carbon brush. The brush 90 is solid and has the shape of an elongated rectangular box, and like the brush 62, includes two semi-circular grooves 132 and 134. The second brush and clip assembly 24 also includes a brush clip 136 that attaches to the mounting plate 92 of the brush fixture 12. The brush clip 136 is attached to the brush 90 by a contact wire 138, preferably made of copper, that electrically connects the brush 90 to a source of electric power, not shown. The contact wire 138 is attached at or near an end of the brush 90, proximate to the semi-circular grooves 132, 134. As illustrated in FIG. 3, at least one of the interior walls of the second brush compartment 34 includes a narrow channel 140 that receives the contact wire 138. The narrow channel 140 allows the contact wire to travel freely as the brush 90 is eroded during the operation of the dynamoelectric machine.

Referring again to FIG. 1 and FIG. 2, the brush fixture 12 includes a first assembly pin hole 144 that is located on the top of the brush fixture 12, near the closed end 38 of the first brush compartment 32. The diameter of the first assembly pin hole 144 is advantageously configured to receive the assembly pin 28. The second assembly pin hole 146 is substantially similar to the first assembly pin hole 144. The second assembly pin hole 146 is located on the bottom of the brush fixture 12, near the closed end 66 of the second brush compartment 34.

Figure 4:
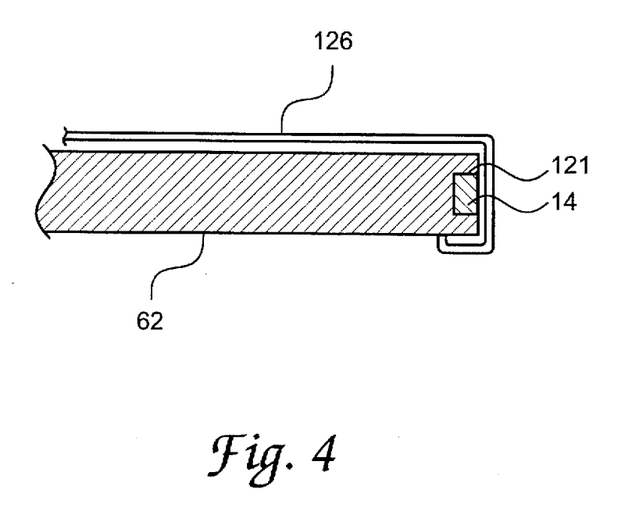
FIG. 4 is a cross-sectional view of a brush and a constant force extension spring configured for insertion into the brush fixture of FIG. 3.

During assembly, the brush 62 is fully inserted into the first brush compartment 32, until one of the semi-circular grooves 120, 122 vertically aligns with the first assembly pin hole 144. FIG. 4 shows a cross-section of a brush 62 and its configuration with respect to the constant force extension spring 14 when it is inserted. In particular, it is noted that the spring 14 is inserted into the groove 121, and the contact wire 126 is arranged around the perimeter of the brush 62 and the cross-section of constant force extension spring 14. This arrangement allows the contact wire to remain unrestricted as the brush erodes.

Referring again to FIGS. 1 and 2, the second brush 90 is inserted into the second brush compartment 34 in substantially the same fashion. Because the constant force extension spring 14 has a natural tendency to recoil, the recoiling force is exerted on the brushes 62 and 90 which tend to push the brushes 62 and 90 out of their respective brush compartments 32 and 34. To retain the brushes 62 and 90, the assembly pin 28 is inserted into the brush fixture 12 so that the assembly pin 28 engages one of the semicircular grooves 120, 122 in the brush 62 and one of the semicircular grooves 132, 134 in the brush 90. So inserted, the assembly pin 28 holds the brushes 62 and 90 in place.

The shielding fixture 26 is then snapped into place adjacent to the brush fixture 12. Once the brush holder assembly 10 is so assembled, the corresponding rotor of the dynamoelectric machine is positioned within the shielding fixture 26. Once the rotor is positioned, the assembly pin 28 is removed and the brushes 62, 90 are forced into contact with the rotor by each of the constant force extension springs 14, 16.

During the operation of the dynamoelectric machine, the rotor spins causing the erosion of the brushes 62, 90. However, because the constant force extension springs 14, 16 continue to push the brushes 62, 90 into contact with the rotor, the brushes 62, 90 and rotor do not become disconnected and the electrical contact between the brushes 62, 90 and the rotor is preserved throughout the usable length of the brushes 62, 90.

Although the foregoing description details the preferred embodiment of the present invention, it should be apparent that many modifications and variations may be implemented without departing from the scope of this invention. For example, although the preferred embodiment houses two brushes, the brush holder assembly could be configured to hold only a single brush, or more than two brushes, depending upon the needs of the application. Also, the invention 13 in no way limited to use in connection with electrographitic carbon brushes. In addition, the brush fixture could be designed to house multiple brushes on diametrically opposite sides of the rotor, or at other various locations, instead of on the same side of the rotor as shown in the preferred embodiment.

I claim:

1. An assembly for holding one or more brushes for contacting a rotating contact of a DYNAMOELECTRIC machine, said assembly comprising:

a single piece brush fixture having at least one brush compartment, each of said at least one brush compartment having an interior configured to receive a brush, said brush compartment having a single open end through which said brush extends;

at least one pair of spring coil compartments formed in said brush fixture, each spring coil compartment having an interior configured to receive a coil on one end of a constant force extension spring having two ends and a coil at each end, said interior of each of said at least one pair of spring coil compartments arranged adjacent to said open end and in open communication with each of said at least one brush compartment in order to permit the constant force extension spring to interact with the brush in said brush compartment to cause the brush to be biased toward the rotating contact;

a cooperating shield fixture surrounding the rotating contact having an opening there through adjacent the rotating contact dimensioned to receive the brush;

means for releaseably connecting said brush fixture to said shield fixture so that said opening in said shield is adjacent said open end of said brush compartment so that said brush extends through said opening and contacts said rotating contact;

wherein each of said at least one brush compartment interior and each of said at least one pair of associated spring coil compartment interiors are substantially enclosed by said brush fixture and said shield fixture when said brush fixture is connected to said cooperating shield fixture and said brush extends through said opening.

2. The assembly of claim 1, wherein a resilient seal is position around said open end between said shield and said brush fixture.

3. The assembly of claim 1, wherein said brush fixture is composed of injection-molded plastic.

4. The assembly of claim 1, wherein said brush compartment has at least one interior wall having a narrow channel along the length of the wall for receiving a contact wire having two ends, one end of which is connected to the brush, and said brush fixture has a face around said open end of said brush compartment, said face having a groove extending along said face from said narrow channel to the exterior of said brush fixture, said groove dimensioned just large enough to receive said contact wire so that the other end of said contact wire can be connected externally of said brush fixture.

5. A brush holder assembly for use in connection with a dynamoelectric machine of the type having at least one brush for contradiction a rotating contact, said brush holder assembly comprising:

at least one single piece brush fixture, each of said at least one single piece brush fixture comprising:

at least one brush compartment, each of said at least one brush compartment having an interior configured to receive a brush;

at least one pair of spring coil compartments associated with each of said at least one brush compartment, each spring coil compartment having an interior configured to receive a spring coil of a constant force extension spring, each of said at least one pair of spring coil compartments arranged adjacent to and in open communication with each of said at least one brush compartment in order to permit the constant force extension spring to interact with the brush in said brush compartment;

at least one cooperating shielding fixture, each of said at least one shielding fixture comprising:

a face plate, said face plate and said brush fixture having means to allow said face plate and said brush fixture to be releasably connected; and a cylindrical housing attached to said face plate, said cylindrical housing having a diameter slightly larger than the rotating contact of the dynamoelectric machine and configured to surround the rotating contact, said cylindrical housing and said face plate having at least one opening there through to receive the brush;

wherein each of said at least one brush compartment interior and each of said at least one pair of associated spring coil compartment interiors are substantially enclosed by said brush fixture and said face plate when said brush fixture is connected to said face plate of said cooperating shielding fixture.

6. The brush holder assembly of claim 5, wherein the shielding fixture is of singular piece construction.

7. The brush holder assembly of claim 5, wherein the shielding fixture is of singular piece construction composed of injection-molded plastic.

8. The brush holder assembly of claim 5, wherein the brush fixture is composed of injection-molded plastic.

9. The brush holder assembly of claim 5, wherein the brush compartment has at least one interior wall having a narrow channel along the length of the wall for receiving a contact wire one and of which is connected to the brush, said channel communicating with a groove extending to the exterior of said brush fixture, said groove being dimensioned just large enough to receive said contact wire.

\* \* \* \* \*

UNITED STATES PATENT AND TRADEMARK OFFICE
CERTIFICATE OF CORRECTION

PATENT NO. : 5,753,992

DATED : May 19, 1998

INVENTOR(S) : Raymond C. Avitable, et. al.

It is certified that error appears in the above-identified patent and that said Letters Patent is hereby corrected as shown below:

Title page, item [73], should read -- DELCO REMY AMERICA, INC., Anderson, Indiana --.

Signed and Sealed this

Twenty-second Day of December, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT : 5,753,992

DATED : May 19, 1998

INVENTOR(S) : Raymond C. Avitable, Robert Farra and Thomas P. Hosmer

It is certified that error appears in the above-identified patent and that said Letters Patent is hereby corrected as shown below:

On the title page, delete [76] and the inventorship data, and substitute therefor the following:
    --[75] Inventors: Raymond C. Avitable, Indianapolis, Ind.; Robert Farra, Acton, Mass.; Thomas P. Hosmer, Concord, Mass.--.

On the title page, before item [21], insert the following:
    --[73] Assignee: DELCO REMY AMERICA, INC., Anderson, Indiana--.

This certificate supersedes Certificate of Correction issued December 22, 1998.

Signed and Sealed this

Second Day of February, 1999

*Attest:*

*Attesting Officer*

*Acting Commissioner of Patents and Trademarks*